United States Patent [19]
Kinugasa et al.

[11] Patent Number: 5,924,406
[45] Date of Patent: Jul. 20, 1999

[54] APPARATUS FOR CONTROLLING AUXILIARY EQUIPMENT DRIVEN BY AN INTERNAL COMBUSTION ENGINE

[75] Inventors: Yukio Kinugasa; Kouhei Igarashi, both of Susono; Takaaki Itou, Mishima, all of Japan

[73] Assignee: Toyota Jidosha Kabushiki Kaisha, Aichi-ken, Japan

[21] Appl. No.: 08/867,724

[22] Filed: Jun. 3, 1997

[30] Foreign Application Priority Data

Jun. 6, 1996 [JP] Japan ................................. 8-144461

[51] Int. Cl.⁶ .............................. F02B 67/00; G01C 21/00
[52] U.S. Cl. ...................... 123/436; 180/65.2; 180/167
[58] Field of Search .................................... 123/436, 478, 123/480, 486; 180/167, 169, 170, 69.4, 65.2, 65.4; 701/102, 103

[56] References Cited

U.S. PATENT DOCUMENTS

| | | | |
|---|---|---|---|
| 4,683,455 | 7/1987 | Kido et al. | 180/282 |
| 5,485,892 | 1/1996 | Fujita | 180/167 |
| 5,515,937 | 5/1996 | Adler et al. | 180/65.2 |
| 5,566,774 | 10/1996 | Yoshida | 180/65.4 |
| 5,638,790 | 6/1997 | Minowa et al. | 123/436 |
| 5,724,944 | 3/1998 | Minowa et al. | 123/436 |
| 5,743,829 | 4/1998 | Tanizawa et al. | 701/57 |
| 5,832,400 | 11/1998 | Takahashi et al. | 701/53 |

FOREIGN PATENT DOCUMENTS

| | | |
|---|---|---|
| 0601300 | 6/1994 | European Pat. Off. |
| 3525107 | 2/1986 | Germany |
| 58-89434 | 5/1983 | Japan |
| 6272753 | 9/1994 | Japan |
| 7107617 | 4/1995 | Japan |
| 7192194 | 7/1995 | Japan |
| 872591 | 3/1996 | Japan |

OTHER PUBLICATIONS

Patent Abstracts of Japan, vol. 018, No. 691 (M–1731), Dec. 26, 1994 & JP 06 272753 A (OKI Electric Ind. Co., Ltd.), Sep. 27, 1994.

T. Esch, et al., "Verbrauchseinsparung Durch Bedarfsgerechten Antrieb Der Nebenaggregate", MTZ Motortechnische Zeitschrift, vol. 55, No. 7/08, Jul. 1, 1994, pp. 416–422, 492–431, XP000457944.

*Primary Examiner*—Tony M. Argenbright
*Assistant Examiner*—Hieu T. Vo
*Attorney, Agent, or Firm*—Kenyon & Kenyon

[57] ABSTRACT

An apparatus for controlling auxiliary equipment driven by an internal combustion engine, which can suppress the deterioration of a specific fuel consumption by controlling the auxiliary equipment based on running environment information provided from a car navigation system or the like. Namely, this apparatus predicts the future maximum output of the internal combustion engine and a running load thereof according to running environment information and vehicle information. Further, if the maximum output is larger than the running load, the auxiliary equipment (for example, a light and an air conditioner) are directly driven by the internal combustion engine. Moreover, surplus energy is stored in an energy storing device. When the maximum output is nearly equal to the running load and that the specific fuel consumption is deteriorated when driving the auxiliary equipments, they are driven by using the energy stored in the energy storing device. Consequently, the deterioration of the fuel consumption ratio due to the operations of the accessories is suppressed.

16 Claims, 12 Drawing Sheets

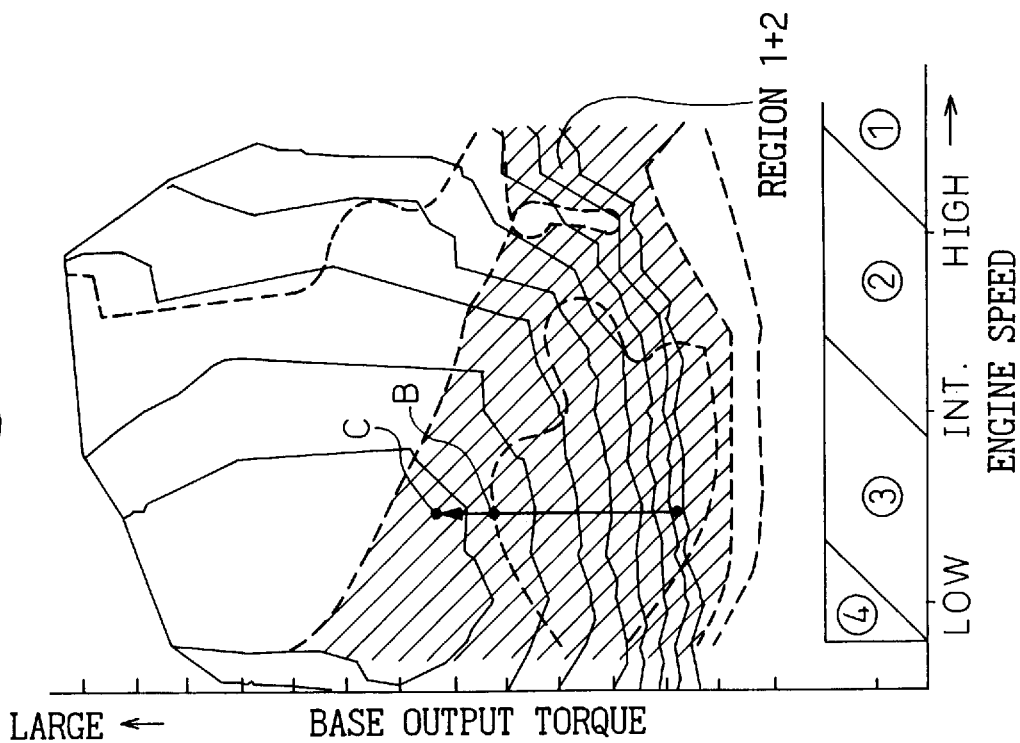
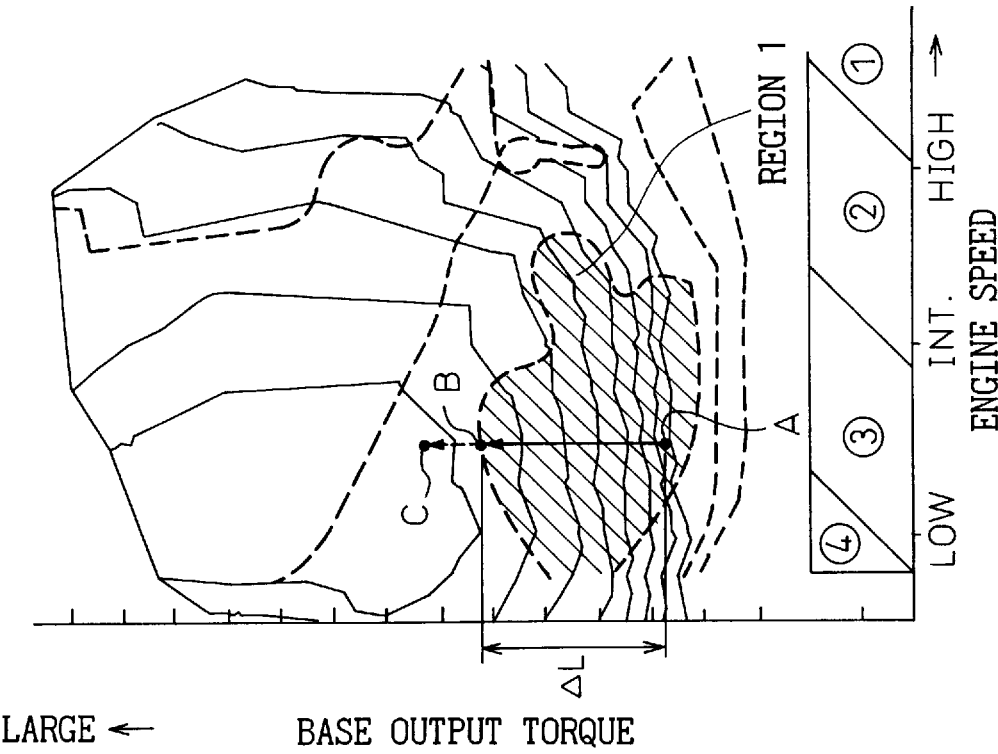

APPARATUS FOR CONTROLLING AUXILIARY EQUIPMENT DRIVEN BY AN INTERNAL COMBUSTION ENGINE

BACKGROUND OF THE INVENTION

1. Field of The Invention

The present invention generally relates to an apparatus for controlling auxiliary equipment driven by an internal combustion engine and, more particularly, to an apparatus for controlling auxiliary equipment driven by an internal combustion engine allowing optimum control of auxiliary equipment according to the future operating conditions of the internal combustion engine.

2. Prior Art

At present, many motor vehicles are provided with what are called automatic transmission devices (hereunder referred to as ATs). The gear position of AT is controlled by a transmission control device (hereunder referred to as "T/MC") using one of plurality of shift patterns (for example, a shift pattern for running on a level road, a shift pattern for climbing an uphill road, and a shift pattern for descending a downhill road) represented as functions of a speed of a motor vehicle and a throttle valve opening.

Further, there has been already proposed an apparatus which can detect a current running position of a motor vehicle using a navigation system optimumly to control T/MC (see Japanese Unexamined Patent Publication (Kokai) No. 6-272753).

However, an internal combustion engine drives not only driving road wheels but also auxiliary equipment (for instance, an alternator, an oil pump for a power steering system, an air conditioner, and a vacuum pump).

Therefore, even if the optimal position of T/MC is selected based on a navigation information similarly as in the prior art, the specific fuel consumption of the internal combustion engine may be deteriorated depending upon the driving conditions of the auxiliary equipments when a high driving force is required, for example, when driving uphill.

The present invention is accomplished to solve the aforementioned problem of the prior art.

SUMMARY OF THE INVENTION

Accordingly, an object of the present invention is to provide an apparatus for controlling auxiliary equipment driven by an internal combustion engine, which can improve the specific fuel consumption of the internal combustion engine by controlling the auxiliary equipment in accordance with the operating conditions of the internal combustion engine, which are predicted by a car navigation system or the like.

According to a first aspect of the present invention, there is provided an apparatus for controlling auxiliary equipment driven by an internal combustion engine, comprising: an information collecting means for collecting information about the running conditions of a vehicle; a specific fuel consumption information determining means for determining a specific fuel consumption corresponding to the operating conditions of the internal combustion engine; and an auxiliary equipment controlling means for controlling auxiliary equipments of the internal combustion engine, in accordance with the information about the running conditions of a vehicle collected by said information collecting means, and the specific fuel consumption information determined by said specific fuel consumption information determining means.

According to the first apparatus of the present invention, the auxiliary equipment is controlled according to the information about the running condition of the vehicle and the specific fuel consumption information.

According to a second aspect of the present invention, there is provided an apparatus for controlling auxiliary equipment driven by an internal combustion engine, comprising: a running environment information collecting means for collecting running environment information of a vehicle; and an auxiliary equipment controlling means for controlling auxiliary equipment of the internal combustion engine, in accordance with the running environment information collected by said running environment information collecting means.

According to the second apparatus of the present invention, auxiliary equipment are controlled in accordance with the collected running environment information.

According to a third aspect of the present invention, there is provided an apparatus for controlling auxiliary equipment driven by an internal combustion engine, comprising: a running environment information collecting means for collecting a running environment information of a vehicle; an information collecting means for collecting information about the driving conditions of the vehicle; and an auxiliary equipment controlling means for controlling auxiliary equipment of the aforesaid internal combustion engine in accordance with to the running environment information collected by said running environment information collecting means, and the information about the driving condition of the vehicle collected by said information collecting means.

According to the third apparatus of the present invention, auxiliary equipment are controlled in accordance with the running environment information and the information about the driving condition of the vehicle.

BRIEF DESCRIPTION OF THE DRAWINGS

Other features, objects and advantages of the present invention will become apparent from the following description of preferred embodiments with reference to the drawings, in which:

FIGS. 7A and 7B are graphs explaining a practical example of an auxiliary equipment control method according to the present invention;

DETAILED DESCRIPTION OF THE PREFERRED EMBODIMENTS

Hereinafter, the preferred embodiments of the present invention will be described in detail by referring to the accompanying drawings.

Figure 1:
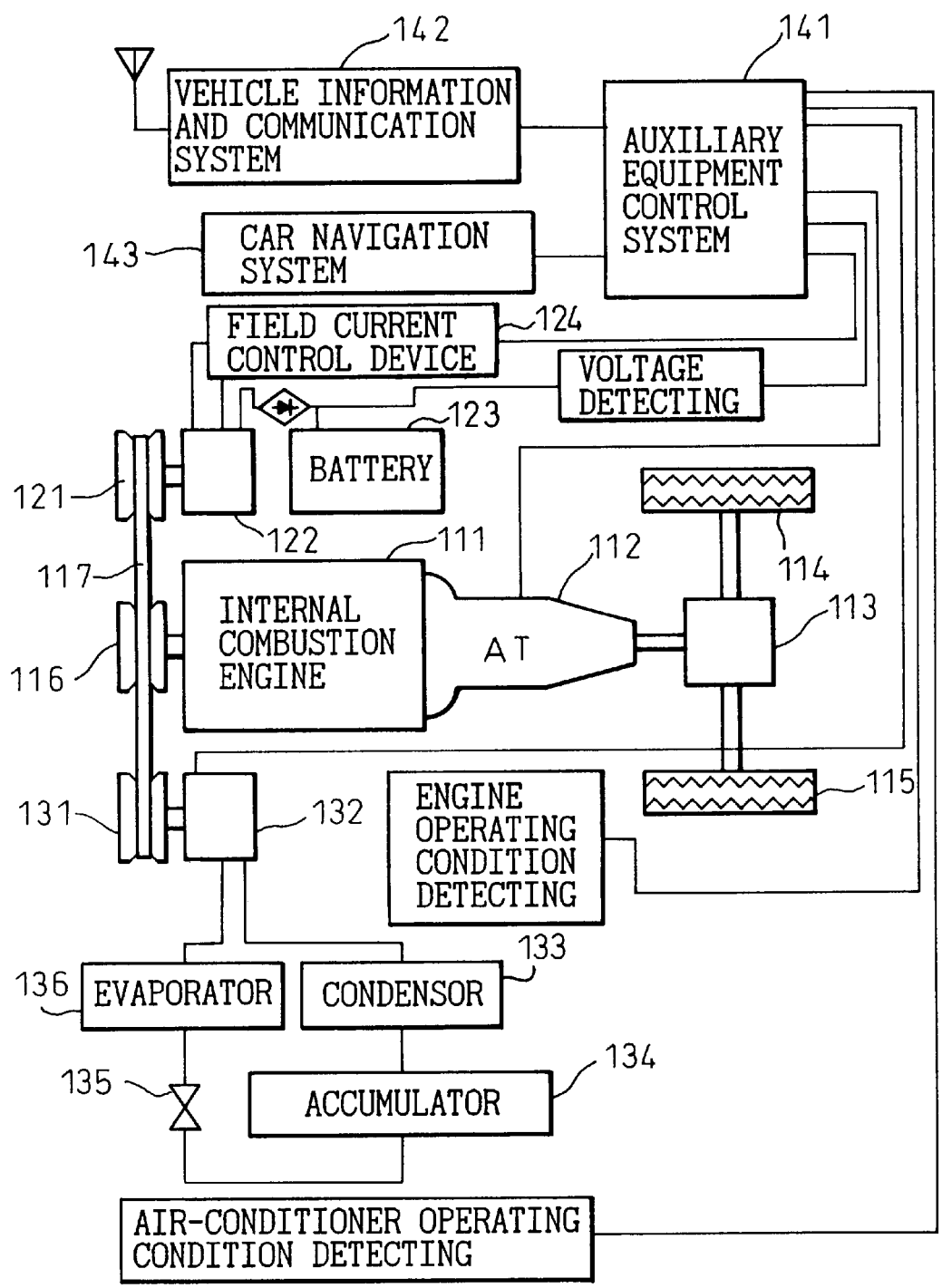
FIG. 1 is a diagram conceptually illustrating a motor vehicle provided with an apparatus for controlling auxiliary equipment driven by an internal combustion engine.

FIG. 1 is a diagram conceptually illustrating a motor vehicle, provided with an apparatus for controlling auxiliary equipment driven by an internal combustion engine, according to the present invention.

The driving force generated by an internal combustion engine 111 is transmitted to driving road wheels 114 and 115 through AT 112 and a differential gear 113.

The driving force generated by the internal combustion engine 111 is further transmitted to an alternator pulley 121, which is directly coupled to a shaft of an alternator 122, and an air-conditioner pulley 131 directly coupled to a shaft of a compressor 132.

The alternator pulley 121 is directly coupled to the alternator 122, and A.C. power generated by the alternator 122 is rectified and is then stored in a battery 123. Incidentally, electric energy generated by the alternator 122 is controlled by regulating a field current of the alternator 122 by a field-current control device 124.

The compressor 132 is provided with a known swash plate (hereunder referred to as "A/CSP"). The compressing ability of the compressor 132 can be continuously controlled by changing of the piston-stroke of the compression 132 by trimming of the inclinating angle of the swash plate rotated by the engine.

A coolant gas of the air conditioner is liquefied in a condenser 133 and is then stored in an accumulator 134 as compressed coolant. Compressed coolant expands at an expansion valve 135 and thus becomes coolant gas. Subsequently, the coolant gas absorbs heat in an evaporator 136 and then returns to the compressor 132.

Incidentally, an oil pump for a power steering system, a vacuum pump for a brake booster, and a corresponding accumulator may be used as auxiliary equipments driven by the internal combustion engine, in addition to the alternator and the air conditioner.

Further, the auxiliary equipments such as the alternator 122 and the air conditioner are controlled by an auxiliary equipments control system 141. Namely, the field current for the field current control device 124 and an inclinating angle of A/CSP are determined by the accessory control system 141.

Moreover, running environment information obtained from at least one of a vehicle information and communication system 142 and a car navigation system 143 is supplied to the accessory control system 141. The vehicle information and communication system 142 is adapted to receive the running environment information that is transmitted by light, radio waves and a magnetic field and concerns the traffic jam conditions of a road, weather conditions, the conditions of traffic signals and information on whether or not there are motor vehicles on a road intersecting with the road at the next crossroad.

The car navigation system 143 recognizes the present position of the vehicle on a map stored in a CD-ROM using GPS (Global Positioning System) satellite. Further, it predicts a running information concerning a date, a time, a distance to a destination, a speed limit, a height, a slope, crossroads which the vehicle passes (namely, traffic signal lights, kinds of roads, data of priority, and data of stopping points, a right or left turn, a region to be traveled and kinds of roads to be driven.

Moreover, the vehicle information concerning the operating conditions of the internal combustion engine (for example, an engine speed, an intake air flow rate, a load of the internal combustion engine and a throttle valve opening), operating conditions of the auxiliary equipment (for instance, energy generated by the alternator, the compressing ability of the compressor, the electrical energy charged in the battery, an amount of the compressed coolant stored in the accumulator), the operating conditions of the vehicle (for example, the operating conditions of a brake and those of the power steering) and AT gear ratio set by T/MC (not shown)) is read into the auxiliary equipment control system 141.

Hereinafter, concepts of the present invention will be described.

Figure 2:
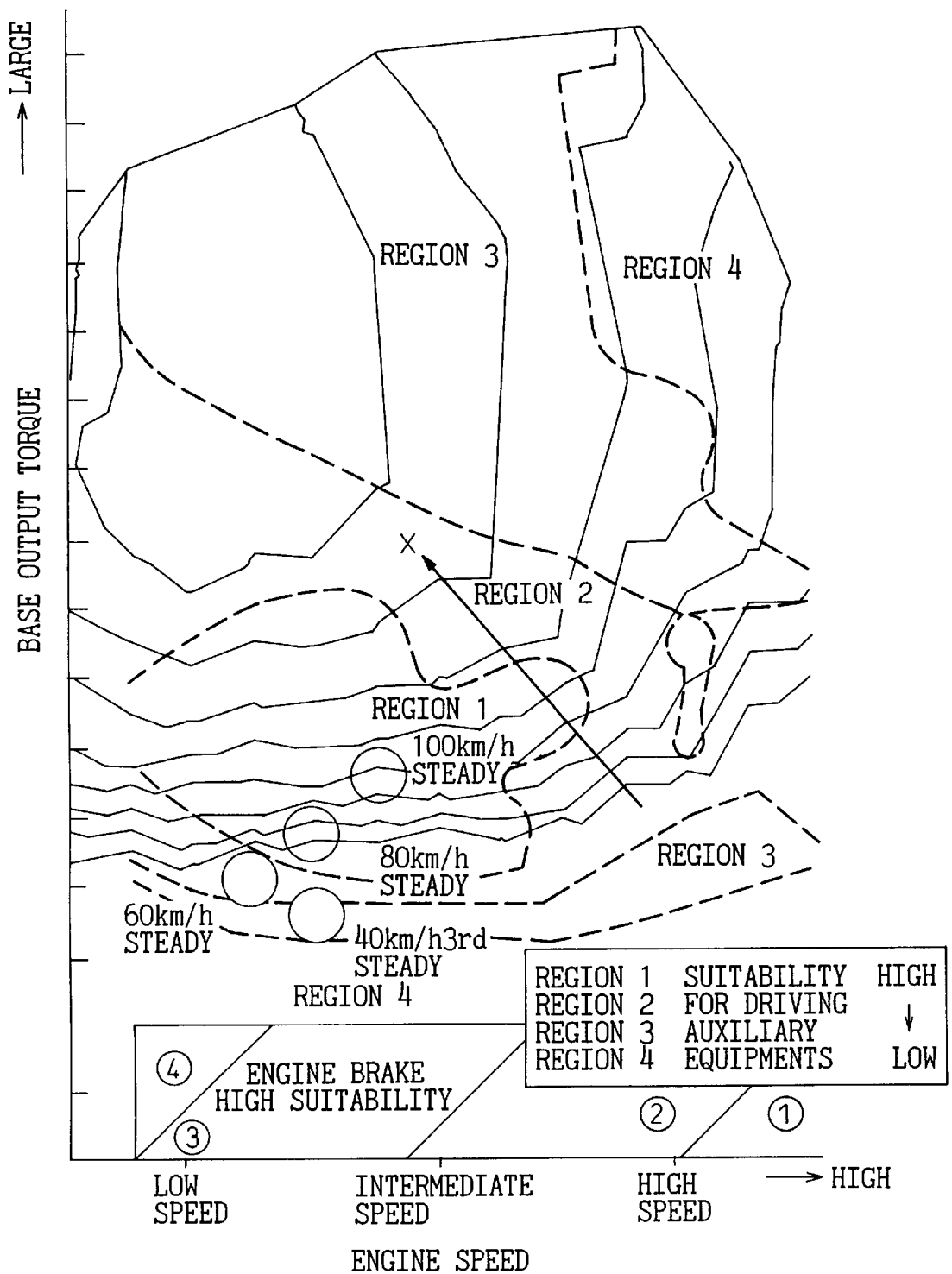
FIG. 2 is a map showing a specific fuel consumption.

FIG. 2 shows a map for showing a specific fuel consumption per a unit additional output when adding fixed amounts of load to drive auxiliary-equipment to the internal combustion engine which is driving in a steady-state operation. In this map, the ordinate denotes a base shaft torque of the internal combustion engine; and the abscissa the engine speed.

Further, in this map, solid contour lines denote the specific fuel consumption of the engine, divided by predetermined size. As moving to the direction of an arrow X (as shown in this map), the specific fuel consumption is improved.

Moreover, dashed lines denotes specific fuel consumption for driving the auxiliary equipments. The smaller the region number becomes, the lower the specific fuel consumption becomes (namely, the more suitable the corresponding region becomes for driving the auxiliary equipment).

Furthermore, an engine brake region belongs to "REGION 1", namely, belong to the most suitable region for driving the auxiliary equipments. Additionally, this engine brake region is further subdivided into four sections which are "SECTION 4", "SECTION 3", "SECTION 2" and "SECTION 1" arranged in the ascending order of the suitability for driving the auxiliary equipment.

For example, in FIG. 2, "80 km/h STEADY" indicates an operating point when an automotive vehicle steadily runs on level ground at a speed of 80 km/h in top gear. Further, "40 km/h 3rd STEADY" indicates an operating point when the automotive vehicle steadily runs on level ground at a speed of 40 km/h in third gear.

Figure 3:
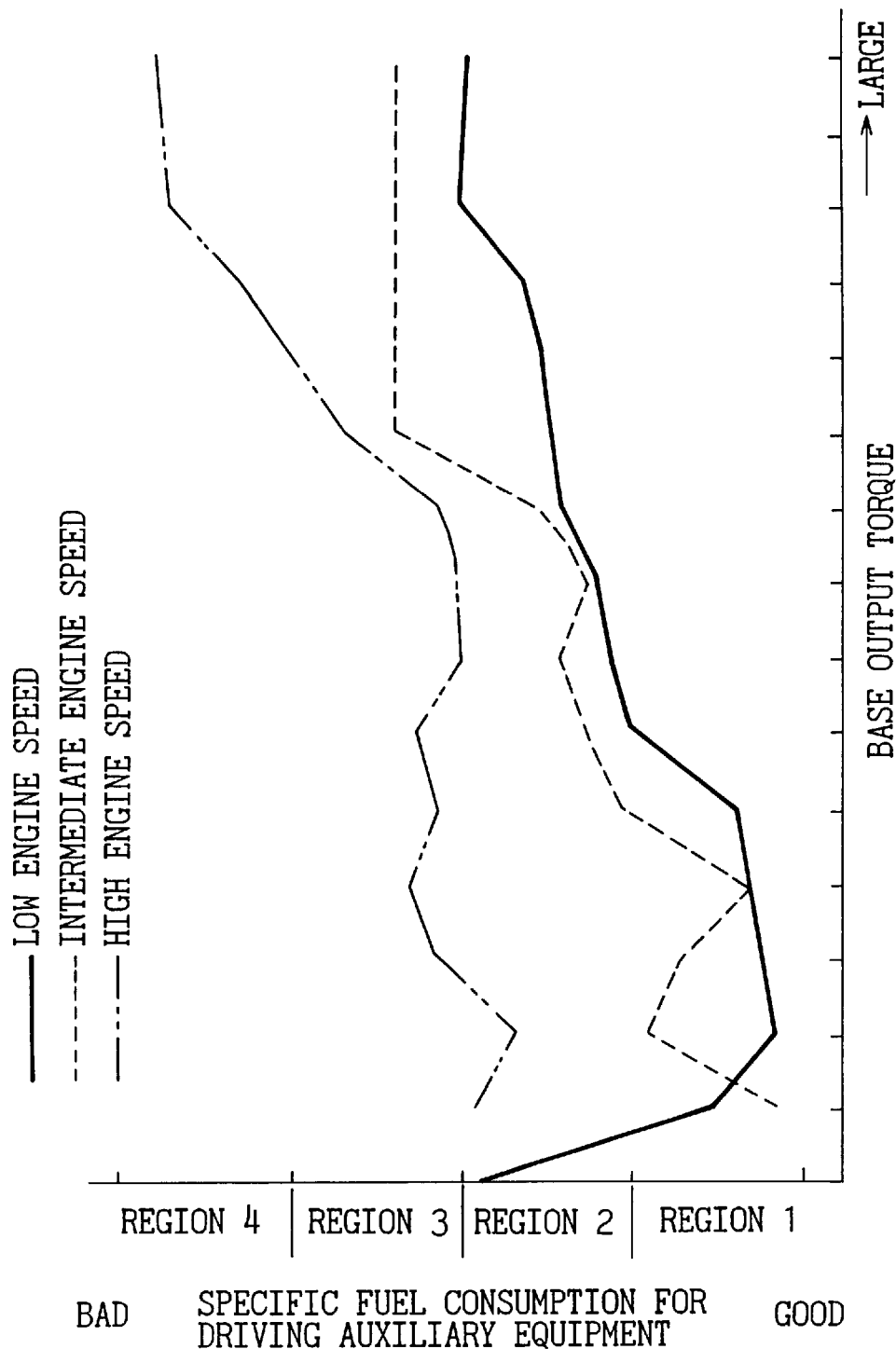
FIG. 3 is a graph illustrating a specific fuel consumption for driving auxiliary equipment.

Generally, the addition of a driving force for driving the auxiliary equipment can be realized by fixing the engine speed and increasing the output torque. FIG. 3 is a graph showing the specific fuel consumption per a unit additional driving force when a certain amount of the driving force for driving the auxiliary equipment is added when the engine is driven at a constant speed. Namely, this graph is a cross sectional view cut by three lines parallel to the ordinate of FIG. 2 and passing through the low speed region, the intermediate speed region and the high speed region, respectively. The abscissa denotes the base output torque of the internal combustion engine before the driving force is added; and the ordinate denotes the specific fuel consumption. Incidentally, a parameter is the engine speed.

As is understood from this graph, there are the following tendencies. Namely, when the base output torque is extremely small, the specific fuel consumption for driving the auxiliary equipments deteriorates as the base output torque increases. Further, when the base output torque is small or intermediate, the specific fuel consumption is saturated at a small value. Furthermore, when the base output torque is large, the specific fuel consumption increases as the base output torque increases.

Figure 4:
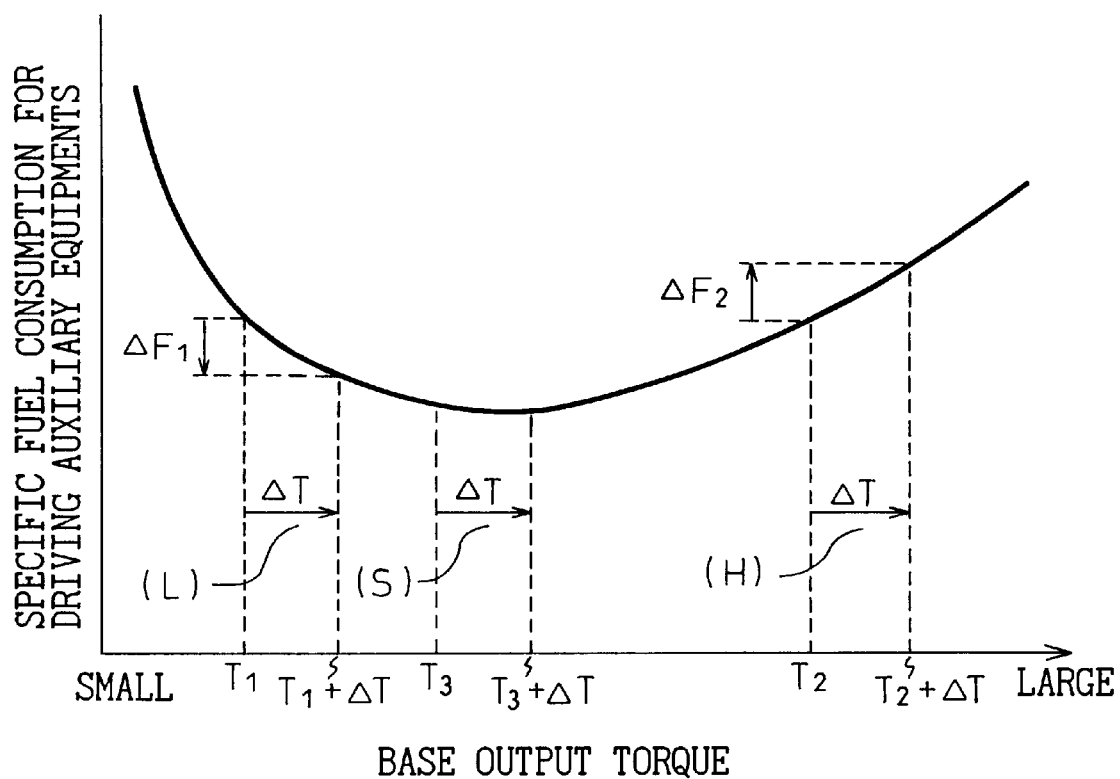
FIG. 4 is a diagram for illustrating the problem to be solved by the present invention.

FIG. 4 is a diagram for illustrating the problem to be solved by the present invention when the internal combustion engine is operated at a low engine speed. In this figure, the abscissa denotes the base output torque; the ordinate denotes the specific fuel consumption for driving the auxiliary equipments. Further, (L) denotes when the base output torque is low; (S) when the base output torque is at a saturated value; and (H) when the base output torque is high.

It is assumed that, for example, the base output torque changes from a low value ($T_1$) through a high value ($T_2$) to an intermediate value ($T_3$) and that lights are lit when the output torque is the high value ($T_2$).

Namely, if the lights are lit when the output torque has the high value ($T_2$), the base output torque is increased by $\Delta T$ so as to deal with an alternator load increased by lighting the lights.

The specific fuel consumption is necessarily deteriorated when the lights are lit when the battery is being charged at the operating condition with the low specific fuel consumption without grasping the present operating condition, or when the auxiliary equipment are controlled without using a navigating information. This is because the lights must be lit when the battery is being charged, the base output torque is increased from $T_2$ to $T_2+\Delta T$, and the specific fuel consumption for driving the auxiliary equipment is increased by $\Delta F_2$ as the future operating condition cannot be predicted.

Conversely, if the vehicle can keep track of the current driving conditions, the specific fuel consumption can be suppressed by controlling the operation of the auxiliary equipment during the high base output torque operation. Further, if the future driving condition can be predicted according to the navigating information, the deterioration of the specific fuel consumption for driving the auxiliary equipment can be suppressed, because it is possible to predict an operating condition with an intermediate output torque follows to that with a high output torque, not to charge the battery at the operating condition with an intermediate output torque, and to charge it at the operating condition with a high output torque without deteriorating the specific fuel consumption by driving the auxiliary equipment.

Further, the specific fuel consumption can be improved by increasing the base output torque by $\Delta T$ and previously storing the electric energy required to light the lights at a low base output torque $T_1$, because it is possible to predict that the operating condition with a low base output torque exists before that with a high base output torque.

Figure 5:
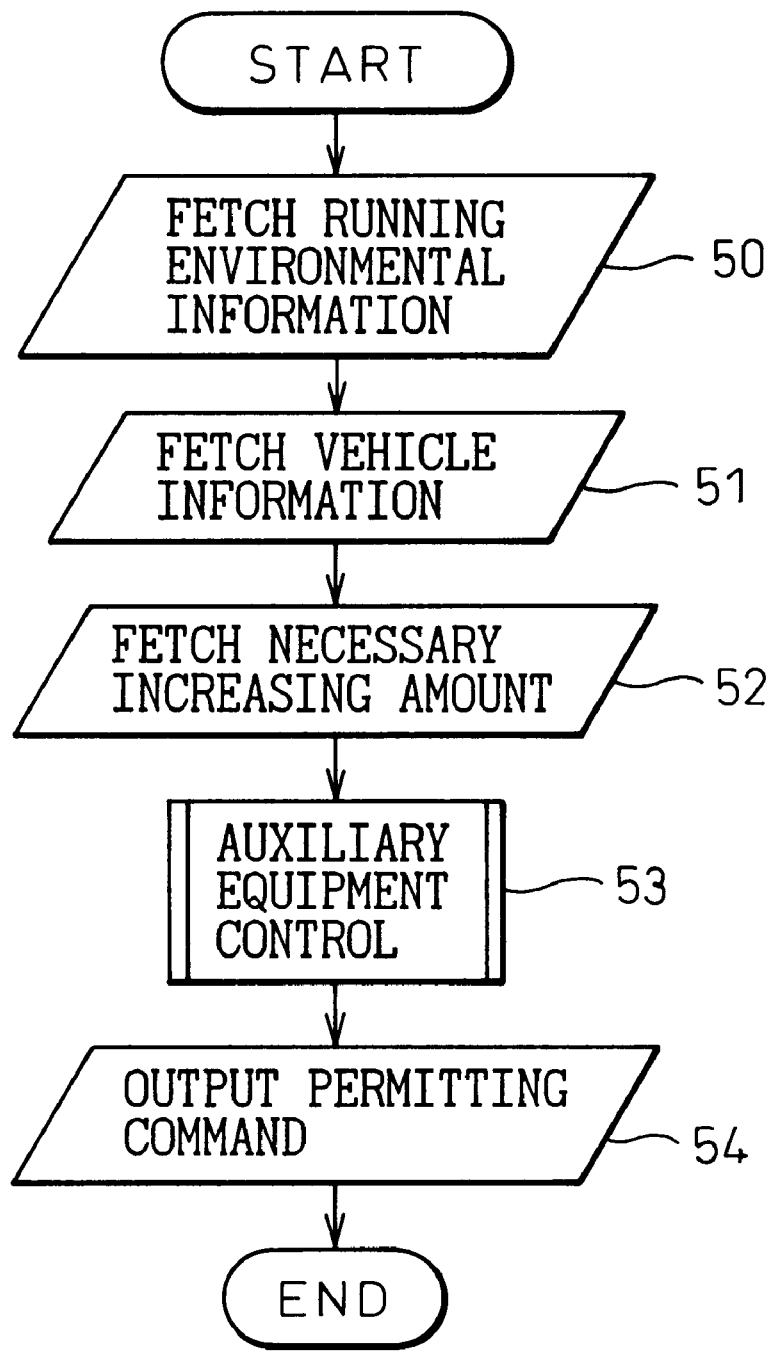
FIG. 5 is a flowchart of an auxiliary equipment control routine.

FIG. 5 is a flowchart of an auxiliary equipment control routine to be executed in the auxiliary equipments control system 141 when the vehicle is running. At step 50, the running environment information is fetched from the vehicle information and communication system 142 and the car navigation system 143. Subsequently, at step 51, the vehicle information is fetched. Moreover, at step 52, a necessary increasing amount P, that is, an increasing amount of the base output torque required when certain auxiliary equipment is operated (for instance, when lighting the light, or when the air-conditioning ability is increased). Then, at step 53, an auxiliary equipment driving subroutine (to be described later) is executed. Finally, at step 54, the operation permitting command for permitting the auxiliary equipment to be operated is outputted. Thus, this subroutine is terminated.

Figure 6:
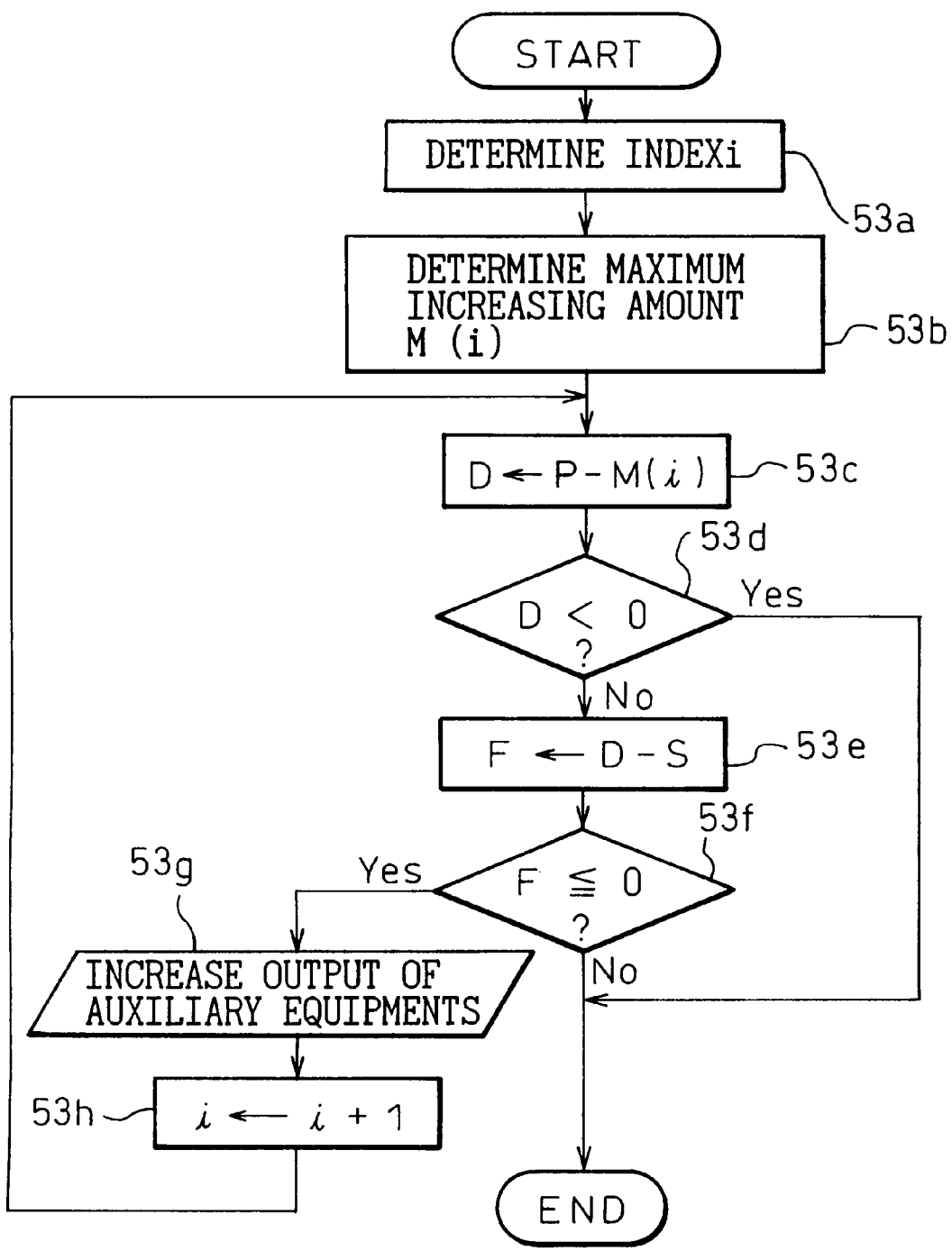
FIG. 6 is a detailed flowchart of an auxiliary equipment control subroutine.

FIG. 6 is a detailed flowchart of the auxiliary equipment driving subroutine executed at step 53. First, at step 53a, an index i indicating the suitability for driving the auxiliary equipments in the present driving condition is determined by using the running environment information, the own-vehicle information and the specific fuel consumption map of FIG. 2.

Then the maximum amount M(i), that is, the permissible maximum amount of the base output torque which can be increased without changing the index indicating the suitability, that is, without changing the operating region is determined at step 53b.

At step 53c, the difference D between the necessary increasing amount P and the maximum amount M(i) is calculated.

At step 53d, it is determined whether or not the difference D is negative.

When the determination at step 53d is affirmative namely, when the difference D is negative, this subroutine is directly terminated.

Conversely, if the determination at step 53d is negative, the control proceeds to step 53e where the quantity of a shortage of energy F is calculated by subtracting the amount S of energy stored in energy storage devices (namely, the battery 123, the accumulator 134 and so forth) from the difference D.

At step 53f, it is determined whether or not the quantity F of the shortage of energy is negative, namely, the whether or not the difference D can be covered by the energy stored in the storage devices.

If the determination at step 53f is negative that is, if the difference D can be covered by the stored energy, this routine is directly terminated.

If the determination at step 53f is affirmative that is, if the difference D cannot be covered by the stored energy, the control proceeds to step 53g.

Then, after the auxiliary equipments are increasingly controlled at step 53g, the index i indicating the suitability for driving auxiliary equipment is incremented, at step 53h, namely, the region where the auxiliary equipments are permitted to be operated is expanded at step 53h. Subsequently, the control is returned to step 532.

FIGS. 7A and 7B are graphs explaining the control method for the auxiliary equipment according to the present invention.

(1) The length of a segment between A and B denotes a permissible increasing amount. Where A denotes an operating point of "80 km/h STEADY" in Region 1, and B denotes an intersection point of a straight line which extends from the point A to a direction, toward which the base output torque increases under a constant engine speed, that is, a straight line extending upwardly and a borderline between REGION 1 and REGION 2.

(2) Output increasing amount $\Delta P$ is represented by a segment AC.

(3) When the output increasing amount $\Delta P$ is larger than the permissible increasing amount $\Delta L$, namely, the segment AC is longer than the segment AB and when the energy stored in the energy storaging devices (namely, the battery 123, the accumulator 134 and so forth) is less than predetermined energy, the engine operating resion is expanded to REGION 2 to cover the output increasing amount $\Delta P$ (see FIG. 7B).

(4) An operating region is expanded until the necessary power for driving auxiliary equipment is obtained.

When the electric power generated by the alternator 122 is controlled by the aforementioned auxiliary equipments control routine, the stored energy S can be estimated by determining whether or not the terminal voltage V of the battery 123 is equal to or higher than a voltage $V_{th}$ at the end of the discharge.

Note, increasing of the output power of the alternator can be accomplished by outputting an increasing demand signal to the field current control device 124.

When the air-conditioning ability of the air conditioner is controlled, the stored energy S can be estimated by measuring the liquid level of the accumulator 134.

Note, increasing of the air-conditioning ability can be accomplished by increasing the angle of the swash plate.

Incidentally, auxiliary equipment can be controlled more accurately by using not only the information concerning the operating conditions of the internal combustion engine (namely, the intake air flow rate, the engine speed, the throttle valve opening) but also information of an outside air temperature and an atmospheric pressure, which are detected by sensors mounted on the vehicle, or a result learned by a known learning system for learning driver's habits (for instance, transmission operating timing, accelerator-pedal operating timing and a difference between the limit speed and an actual driving speed) as the vehicle information when controlling the alternator or the air conditioner.

In the case of the aforementioned embodiment, the specific fuel consumption can be improved by controlling the auxiliary equipment in accordance with the present running environment information and the vehicle information. However, the auxiliary equipment are not positively controlled by predicting the current and subsequent running conditions according to information obtained from the vehicle communication and information system or the car navigation system.

Second embodiment of the present invention aims to solve the problem described herein-above. Accordingly, an object of the second embodiment of the present invention is to control the auxiliary equipment more accurately by using the running environment information predicted by the vehicle communication and information system 142 or the car navigation system 143.

Namely, a schedule for controlling the auxiliary equipment is established according to a driving speed and a running load determined from the running environment information (incidentally, this information includes, for instance, information concerning the shortest path, the traffic condition, the conditions of a sloping road and so on (the details of the running environment information will be described later)) obtained from the vehicle communication and information system 142 or the car navigation system 143.

Figure 8:
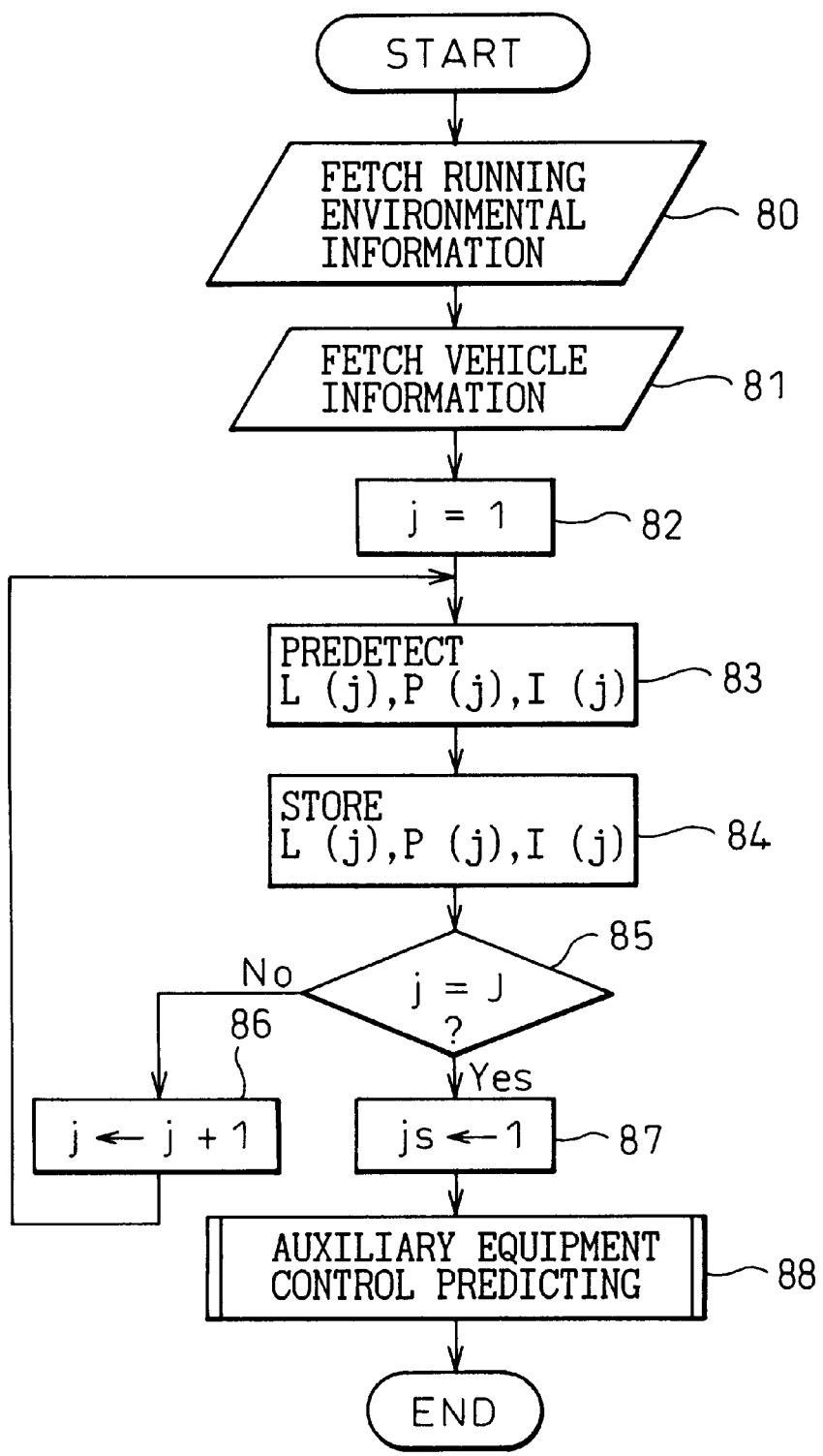
FIG. 8 is a flowchart of a predicting routine.

FIG. 8 is a flowchart of an auxiliary equipment control predicting routine. First, at step 80, the running environment information is fetched from the vehicle information and communication system 142 and the car navigation system 143. Then, at step 81, the vehicle information is fetched.

At step 82, the index j indicating a running section, which is one of the sections into which a running path from the start point to the end point is divided, is set at an initial value of "1". Then, at step 83, the output torque L(j) required to drive the running zone j, the necessary increasing amount P(j) required to operate the auxiliary equipments, and the auxiliary equipments driving suitability index I(j) representing the suitability for driving the auxiliary equipment described by referring to FIG. 2 are predicted according to the running environment information and the vehicle information. Next, at step 84, the predicted output torque L(j), necessary increasing amount P(j) and accessory driving suitability index I(j) are stored (in a memory).

At step 85, it is determined whether or not the index j representing a running section reaches the maximum value J, namely, whether or not the prediction is completed for all of the running sections. If the determination is negative, the control proceeds to step 86 where the running section index j is incremented. Then, the control returns to step 83.

When the determination at step 85 is affirmative, that is, when the prediction is completed, the running section index $j_s$ used in the auxiliary equipments control predicting subroutine for predicting the auxiliary equipment control schedule is set to "1". Then, at step 88, the auxiliary equipment control predicting subroutine is executed. Subsequently, this routine is terminated.

Figure 9:
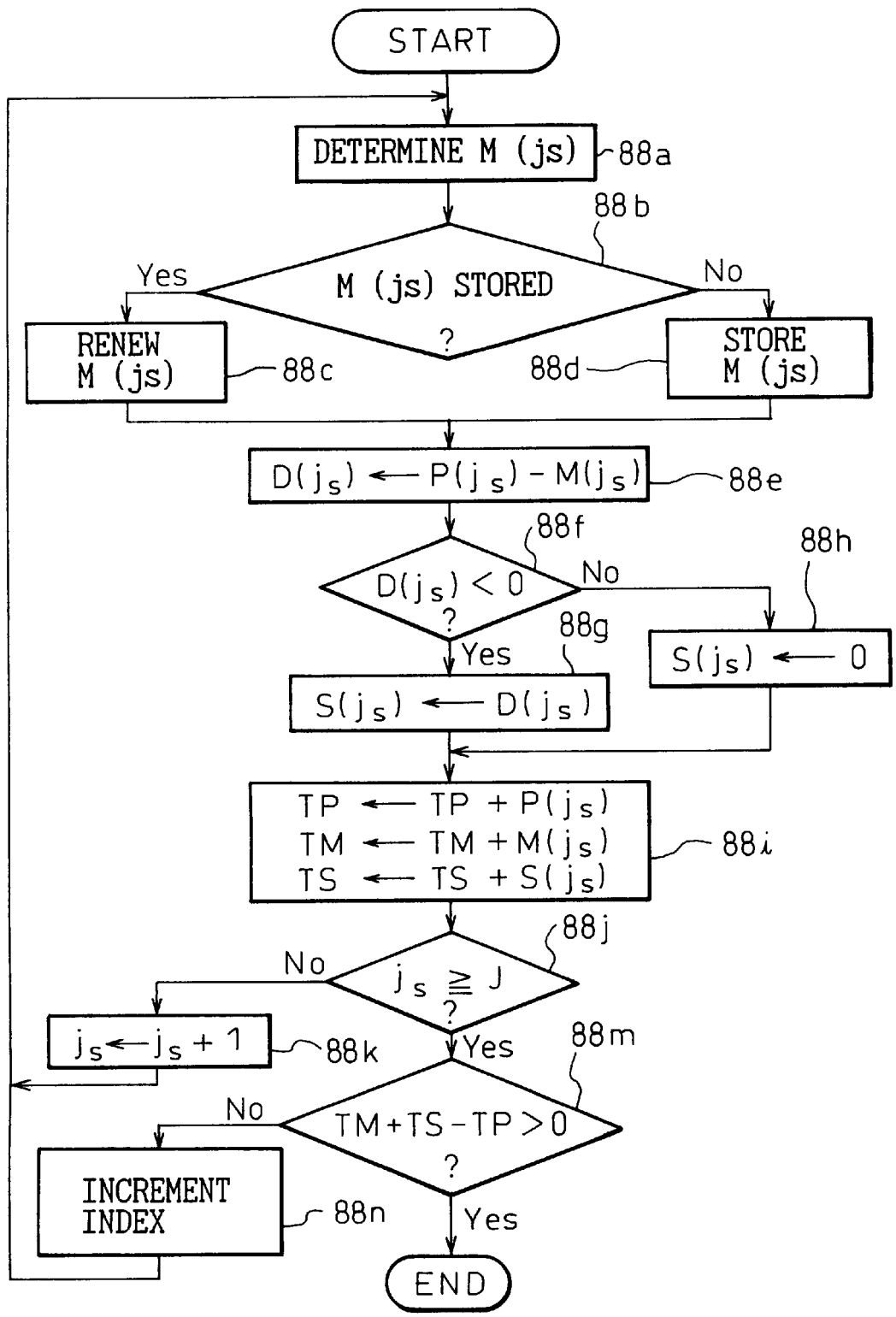
FIG. 9 is a detailed flowchart of an auxiliary equipment control predicting subroutine.

FIG. 9 is a detailed flowchart of the auxiliary equipment control predicting subroutine executed at step 88. First, at step 88a, the maximum increasing amount $M(j_s)$, that is, the permissible maximum amount output torque which can be increased without changing the suitability index $I(j_s)$, is determined with reference to the fuel consumption ratio map of FIG. 2.

Then, it is determined at step 88b whether or not the maximum increasing amount $M(j_8)$ has been already stored in the memory. When the determination is affirmative, namely, when the maximum increment $M(j_s)$ has been already stored in the memory, the maximum increasing amount $M(j_s)$ is updated at step 88c. Subsequently, the control proceeds to step 88e.

At step 88e, the difference between the necessary increasing amount $P(j_s)$ and the maximum increasing amount $M(j_s)$ is calculated. Then, at step 88f, it is determined whether or not the difference $D(j_s)$ is negative.

When the determination at step 88f is affirmative, namely, if the difference $D(j_s)$ is negative, the difference $D(j_s)$ is set as the stored energy $S(j_s)$ in a running section $j_s$. Subsequently, the control proceeds to step 88i. Conversely, if the determination at step 88f is negative, namely, if the difference $D(j_s)$ is positive, the energy $S(j_s)$ stored in a running section $j_s$ is set to "0". Then, the control proceeds to step 88i.

At step 88i, an accumulated necessary increasing amount TP, that is, an accumulated value of the necessary increasing amount $P(j_s)$ after start of running obtained, an accumulated maximum increasing amount TM, which is an accumulated value of the maximum increasing amount, after start $M(j_s)$ obtained, and accumulated stored energy, which is an accumulated value of the stored energy $S(j_s)$ obtained, are determined by the following expressions.

TP←TP+P($j_s$)

TM←TM+M($j_s$)

TS←TS+S($j_s$)

At step 88k, it is determined whether or not the running section index $j_s$ reaches the maximum value J, namely, whether or not the auxiliary equipment control schedule is predicted for all of the running sections. When the determination is negative, the running section index $j_s$ is incremented at step 88k. Then, the control returns to step 88a.

When the determination at step 88j is affirmative, the control proceeds to step 88m where it is determined whether or not TM+TS−TP>0, namely, whether or not the accumulated value of the auxiliary equipment driving energy, which is supplied by the internal combustion engine and the energy storage devices, is larger than the accumulated value of the necessary auxiliary equipment driving energy.

When the determination at step 88m is affirmative, namely, if the necessary auxiliary equipment driving energy can be supplied from the internal combustion engine and the energy storage devices, this subroutine is terminated.

Conversely, if the determined at step 88m is negative, namely, if the necessary auxiliary equipments driving energy cannot be supplied from the internal combustion engine and the energy storage devices, the control proceeds to step 88n where the auxiliary equipments driving suitability index $I(j_s)$ is incremented. Then, the control returns to step 88a.

Namely, at step 88n, if, for instance, the minimum value of the auxiliary equipment driving suitability index $I(j_s)$ ($1<j_s<J$) is "1", the values of all of the auxiliary equipments driving suitability indices $I(j_s)$, whose value is "1", are replaced with "2". As a result, the auxiliary equipments driving regions is expanded. Then, a reprediction is performed.

Figure 10:
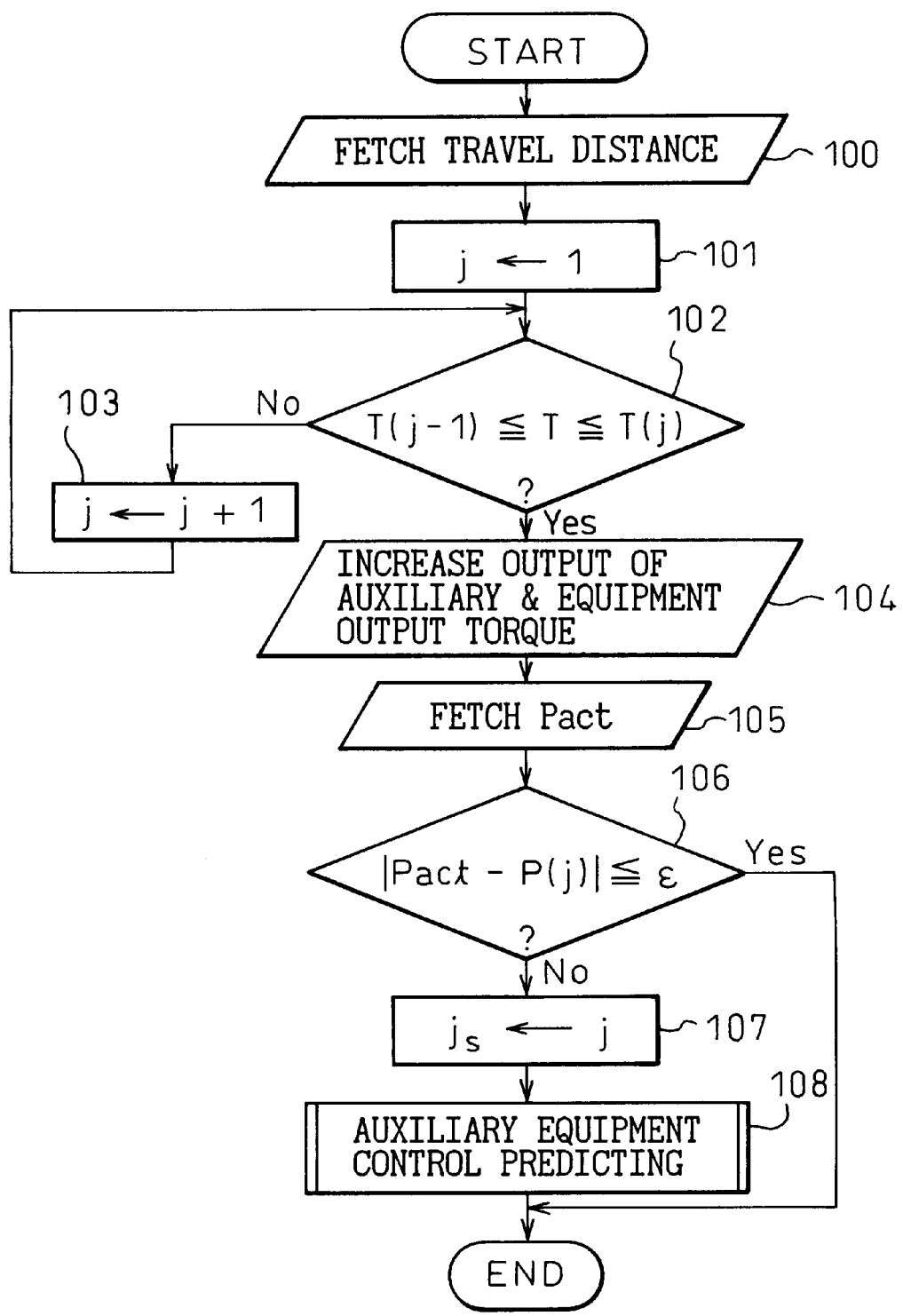
FIG. 10 is a flowchart of a control performing routine.

FIG. 10 is a flowchart of an auxiliary equipment control executing routine for executing an auxiliary equipment control operation in accordance with the prediction. First, at step 100, the travel distance T after predicting is fetched from, for example, a trip meter.

Then, at step 101, the running section index j is set at a initial value of "1". Subsequently, the current running section is determined at steps 102 and 103.

Namely, at step 102, it is determined whether or not $T(j-1)<T<T(j)$. If the determination is negative, the running section index k is incremented at step 103. Then, the control returns to step 102.

If the determination at step 102 is affirmative, the control proceeds to step 104 where the output torque L(j), the necessary increasing amount P(j) and the maximum increasing amount M(j) are fetched from the memory of the auxiliary equipments control system 141 and then an output of the auxiliary equipment is increased to P(j), and the output torque of the internal combustion engine is increased to {L(j)+M(j)} (namely, the maximum output).

If the actual running condition agrees with the predicted running condition, the aforementioned operation causes no problems. However, when the actual running condition does not agree with the predicted running condition due to an accidental traffic jam, the following reprediction is further performed.

Namely, in step 105, the actual auxiliary equipment driving energy $P_{act}$ is fetched by detecting the operating condition of the auxiliary equipment (for example, the operating condition of the air conditioner or the alternator). Then, at step 106, it is determined whether or not the absolute value of the difference between the actual accessory driving energy $P_{act}$ and the necessary increasing amount P(j) is equal to or less than a predetermined value $\epsilon$.

If the determination at step 106 is affirmative, it is decided that the difference between the actual accessory driving energy and the predicted energy is within an allowable range. Thus, this routine is terminated.

Conversely, if the determination at step 106 is negative, it is decided that the actual running condition does not agree with the predicted condition. Then, the control proceeds to step 107 where an initial value of the running section index $j_s$ used in the auxiliary equipment control repredicting subroutine is set at j.

Further, at step 108, the auxiliary equipment control repredicting subroutine is performed to the running sections following the running section j at which the disagreement between the actual running condition and the predicted running condition first occurs. Incidentally, the auxiliary equipment control repredicting subroutine is identical to the auxiliary equipment control predicting operation of FIG. 9.

Figure 11:
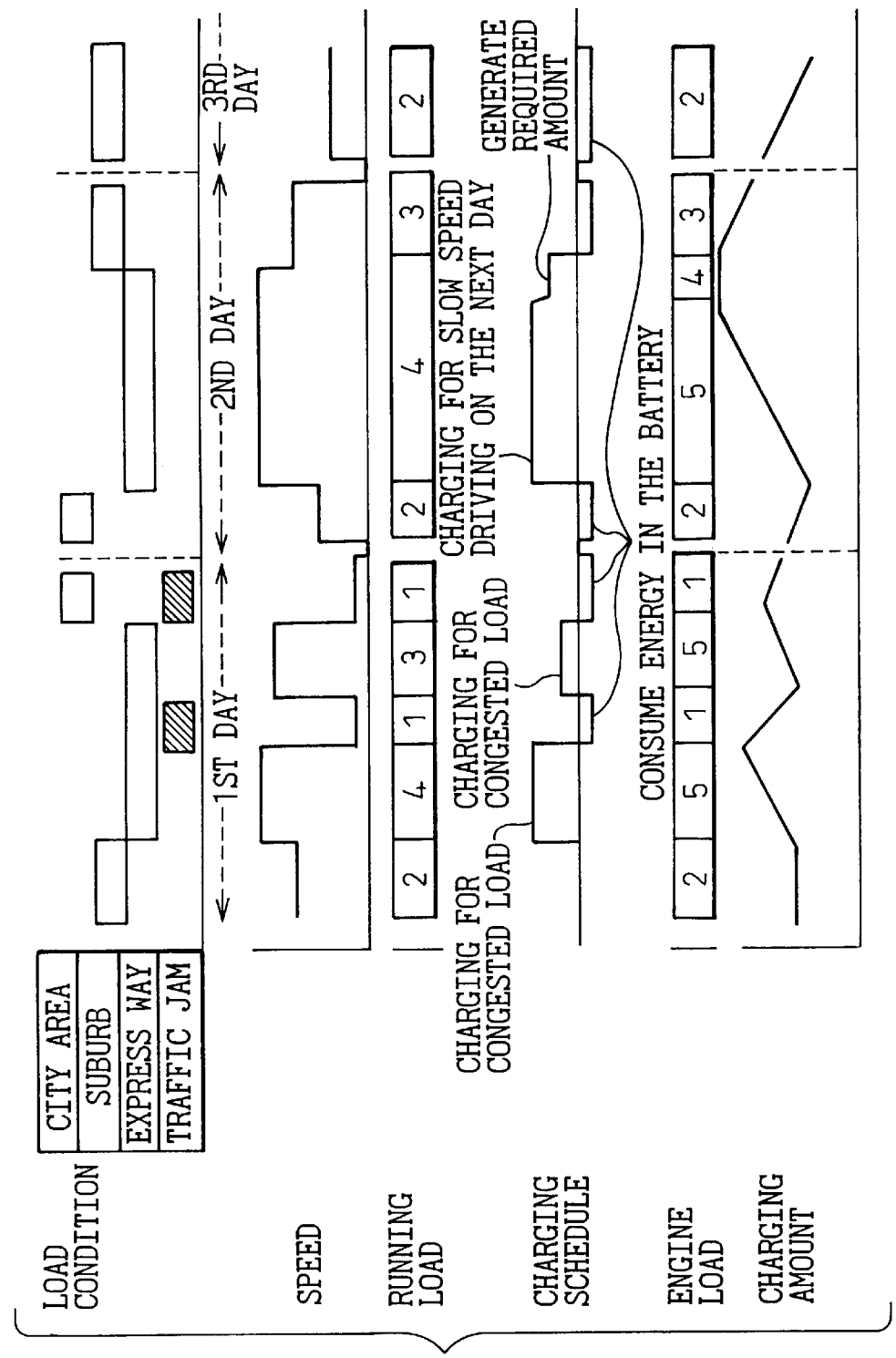
FIG. 11 is a diagram illustrating a driving schedule of an alternator.

FIG. 11 illustrates an example of the driving schedule of the alternator 123, which is determined based on the predicted running condition. Incidentally, the running load and the engine load become larger as the numerals become larger.

Namely, on a first day, the vehicle runs on an expressway after driving in the suburbs. Thereafter, the vehicle drives in a city area and reaches a destination. Further, it is predicted that traffic jams will occur on the expressway and in the city area.

It is further predicted from this result that the running load in the suburbs is "2", that the running load on the expressway is "4" and that the running load at a congested place is "1".

Based on this prediction, the driving schedule of the alternator is established as follows. For instance, in the suburbs, it is intended to maintain the present quantity of charged electricity in the battery by reducing exciting current. Further, on the expressway, the battery 123 is charged with surplus power by increasing the exciting current. Furthermore, at the congested place, the exciting current for the alternator is reduced or is decreased to zero. Thus, on the expressway and at the congested place, the power stored in the battery 123 is consumed so that the load of the internal combustion engine becomes "1". Consequently, the specific fuel consumption is prevented from being deteriorated.

On a second day, the vehicle drives on the an expressway and in the suburbs after driving in the city area. Then, the vehicle reaches a destination. Incidentally, a traffic jam is not predicted. Consequently, it is predicted from this result that the running load in the city area is "2", that the running load on the expressway is "4" and that the running load in the suburbs is "3".

According to this prediction, the driving schedule of the alternator is established as follows. Namely, in the city area, the load of the internal combustion engine is reduced by using the power charged in the battery 123 on the preceding day. Further, on the expressway, the battery 123 is charged with surplus power by increasing the exciting current.

During running on the expressway, the battery 123 is fully charged. Thus, only energy corresponding to the consumed power is generated by reducing the field current. In contrast, in the suburbs, the power stored in the battery 123 is consumed by reducing the exciting current or decreasing this exciting current to zero.

Consequently, the specific fuel consumption can be improved by controlling the field current supplied from field current control device 124 according to this predetermined schedule.

Figure 12:
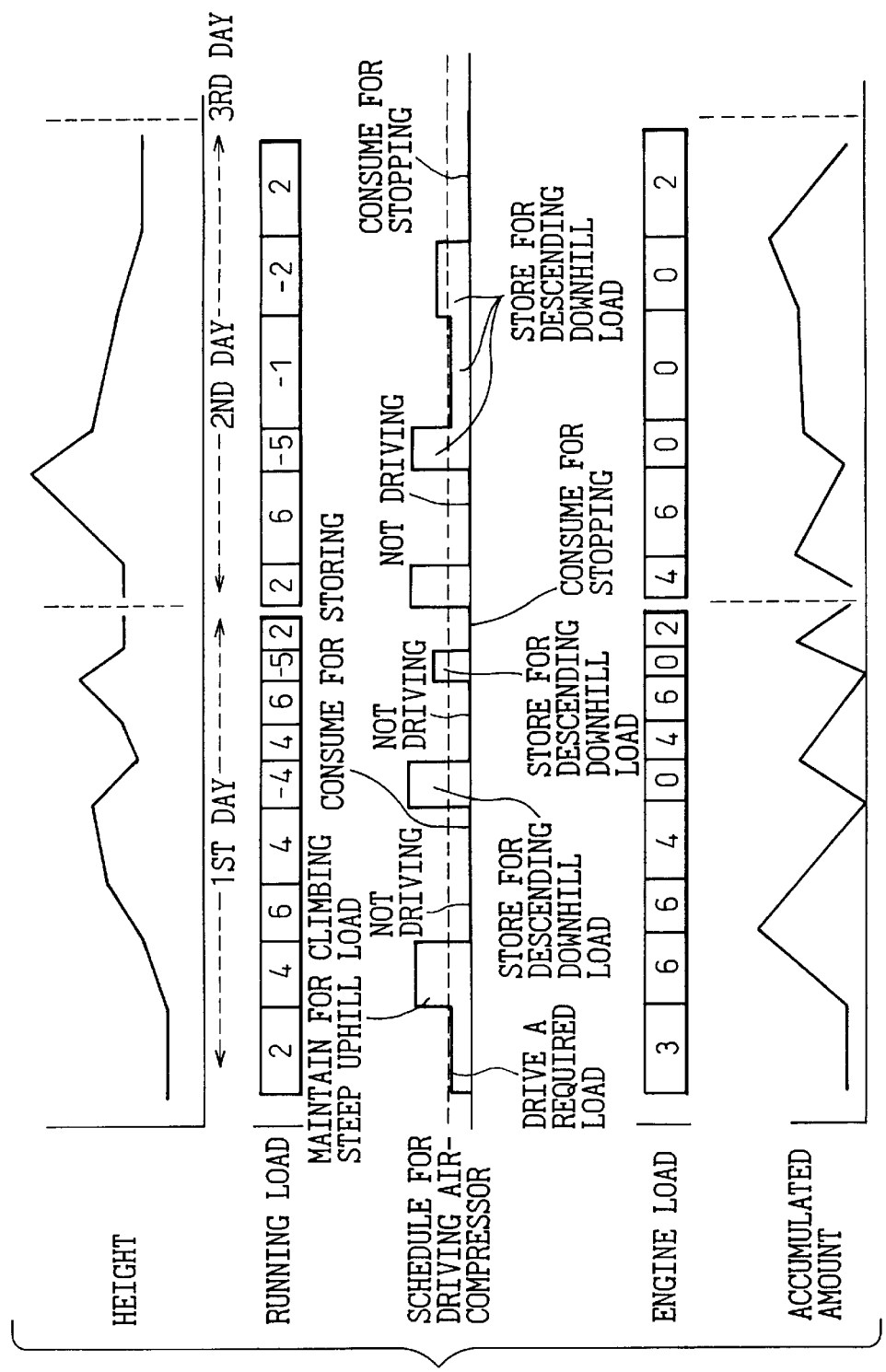
FIG. 12 is a diagram illustrating a driving schedule of an air conditioner.

FIG. 12 illustrates an example of a driving schedule of the air conditioner, which is determined according to the predicted running conditions.

Namely, on a first day, after running on a flat road, the vehicle repeats uphill-road climbing and downhill-road descents. Thereafter, the vehicle drives on another flat road and thus reaches a destination.

It is determined from this result that A/CSP is set at an intermediate position on the flat road to agree with a required ability. Because the running load is relatively small when climbing gently-sloping uphill roads and descending downhill roads, A/CSP is set at a maximum tilt position to store the liquefied coolant in the accumulator 135. Because the running load is relatively large when climbing a steeplysloping uphill road, A/CSP is set at a minimum tilt position to make the air conditioner idle. Namely, the air conditioner is controlled according to the aforementioned schedule.

On a second day, after running on a flat road, the vehicle climbs a steep uphill road. Then, the vehicle descends a long downhill road. Finally, the vehicle runs on a flat road and thus reaches a destination.

During running on the flat road, the liquefied coolant is stored for climbing the steep uphill road. Further, in the case of climbing the steep uphill road, the air conditioner is not driven but the air-conditioning is performed by using the stored liquefied coolant.

In the case of descending the downhill road, the liquefied coolant is positively stored. Further, after the accumulator is filled up with the liquefied coolant, a required air-conditioning operation is performed by setting the tilt angle of A/CSP at a small angle. Then, during the final running on the flat road, the air-conditioning operation is performed by using the liquefied coolant stored in the accumulator 134.

In accordance with the aforementioned second embodiment of the present invention, the operating schedule for the auxiliary equipment is established according to the predicted running load and the load generated by the internal combustion engine. The specific fuel consumption can be improved by operating the auxiliary equipments according to this schedule.

Note, when the disagreement between the actual running condition and the scheduled condition occurs after actual running, the operating schedule of the auxiliary equipment can be predicted again.

Moreover, though the internal combustion engine operates in the region with a low auxiliary equipment driving suitability in accordance with the energy stored in the battery 123 or the accumulator 135, auxiliary equipment may be operated.

For example, when it is predicted that a light load running with the low auxiliary equipments driving suitability is continued for 10 minutes, the following auxiliary equipments driving schedule may be selected so that the specific fuel consumption can be improved. Namely, energy is stored by driving the auxiliary equipments in a first half (namely, 5 minutes) of the period. Further, in a second half of the period, the stored energy is consumed for driving the auxiliary equipment.

Incidentally, in the aforementioned two embodiments of the present invention, the running environment information is obtained from the vehicle information and communication system or the car navigation system. However, the running (environment) information may be manually inputted from an input unit such as a keyboard or remote controller.

For example, the running information may be inputted in the following format: No. (namely, the section No. of a running road)/ the traveled distance / the expected speed of the vehicle / a change in height.

The apparatus of the present invention for controlling the auxiliary equipments driven by the internal combustion engine can be applied to all kinds of motor vehicles. However, especially, if this apparatus is applied to a motor vehicle, having a large electric load, for example, a large number of electrical devices or an EHC (electrically heated catalyst), the total engine load can be reduced. Moreover, the specific fuel combustion of the internal combustion engine can be improved considerably.

Additionally, in the aforementioned embodiment of the present invention, the specific fuel consumption map of FIG. 2 is set as a function of the engine speed and the base output torque. However, the specific fuel consumption map of the present invention is not limited thereto. It may be defined as a function of, for example, the kind of the internal combustion engine, the load of the internal combustion engine, the intake air flow rate and the torque.

Besides, in the aforementioned embodiment of the present invention, the regions are divided every the predetermined amount of the specific fuel consumption. However, such a region may be further divided into sections.

In addition, a plurality of fuel consumption ratio maps may be provided corresponding to the operating conditions of the internal combustion engine, respectively. Further, such maps may be changed according to the operating conditions of the internal combustion engine.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

We claim:

1. An apparatus for controlling auxiliary equipment driven by an internal combustion engine of a vehicle, comprising:

a vehicle information collecting means for collecting information of operating conditions of the vehicle;

a specific fuel consumption information collecting means for collecting information of a specific fuel consumption corresponding to an operating condition of the internal combustion engine of the vehicle; and an auxiliary equipment controlling means for controlling auxiliary equipment driven by the internal combustion engine in accordance with the vehicle information collected by said vehicle information collecting means and the specific fuel consumption information collected by said specific fuel consumption information collecting means.

2. An apparatus for controlling auxiliary equipment driven by an internal combustion engine of a vehicle, comprising:

a running environment information collecting means for collecting information of a running environment around the vehicle; and an auxiliary equipment controlling means for controlling auxiliary equipment driven by the internal combustion engine in accordance with the running vehicle information collected by said running environment information collecting means.

3. An apparatus for controlling auxiliary equipment driven by an internal combustion engine of a vehicle, comprising:

a running environment information collecting means for collecting information of a running environment around the vehicle;

a vehicle information collecting means for collecting information of operating conditions of the vehicle; and an auxiliary equipment controlling means for controlling auxiliary equipments driven by the internal combustion engine in accordance with the running environment information collected by said running environment information collecting means and the vehicle information collected by said vehicle information collecting means.

4. An apparatus for controlling auxiliary equipment driven by an internal combustion engine of a vehicle of claim 2 or 3, wherein said auxiliary equipment controlling means comprises a predicting means for predicting an output of the internal combustion engine and a running load in accordance with the running environment information collected by said running environment information collecting means, and controls in accordance with the output of the internal combustion engine and the running load predicted by said predicting means.

5. An apparatus for controlling auxiliary equipment driven by an internal combustion engine of a vehicle of claim 4, further comprising:

a repredicting means for repredicting an output of the internal combustion engine and a running load when an actual output of the internal combustion engine and an actual running load deviates from the predicted output of the internal combustion engine and the predicted running load predicted by said predicting means beyond fixed allowable limits respectively.

6. An apparatus for controlling auxiliary equipments driven by an internal combustion engine of a vehicle of claim 2 or 3, wherein said running environment information collecting means is a navigation system.

7. An apparatus for controlling auxiliary equipments driven by an internal combustion engine of a vehicle of claim 2 or 3, wherein said running environment information collecting means is an information acquiring means for acquiring information concerning the traffic condition by communicating with information sources.

8. An apparatus for controlling auxiliary equipment driven by an internal combustion engine of a vehicle of claim 4, further comprising:

an energy storing means for storing the energy generated by the internal combustion engine when the internal combustion engine is being operated under a specific operating condition where a fuel increasing amount required for driving auxiliary equipments is less than a fixed amount, and supplying the stored energy for driving auxiliary equipment when the internal combustion engine is not being operated under the specific operating condition.

9. A method for controlling auxiliary equipment driven by an internal combustion engine of a vehicle, comprising steps of:

a vehicle information collecting step for collecting information of operating conditions of the vehicle;

a specific fuel consumption information collecting step for collecting information of a specific fuel consumption corresponding to an operating condition of the internal combustion engine of the vehicle; and an auxiliary equipment controlling step for controlling auxiliary equipment driven by the internal combustion engine in accordance with the vehicle information collected at said vehicle information collecting step and the specific fuel consumption information collected at said specific fuel consumption information collecting step.

10. A method for controlling auxiliary equipment driven by an internal combustion engine of a vehicle, comprising steps of:

a running environment information collecting step for collecting information of a running environment around the vehicle; and an auxiliary equipment controlling step for controlling auxiliary equipment driven by the internal combustion engine in accordance with the running vehicle information collected at said running environment information collecting step.

11. A method for controlling auxiliary equipment driven by an internal combustion engine of a vehicle, comprising steps of:

a running environment information collecting step for collecting information of a running environment around the vehicle;

a vehicle information collecting step for collecting information of operating conditions of the vehicle; and an auxiliary equipment controlling step for controlling auxiliary equipment driven by the internal combustion engine in accordance with the running environment information collected at said running environment information collecting step and the vehicle information collected at said vehicle information collecting step.

12. A method for controlling auxiliary equipment driven by an internal combustion engine of a vehicle of claim 10 or 11, wherein said auxiliary equipment controlling step comprises a predicting step for predicting an output of the internal combustion engine and a running load in accordance with the running environment information collected at said running environment information collecting step, and controls in accordance with the output of the internal combustion engine and the running load predicted at said predicting step.

13. A method for controlling auxiliary equipment driven by an internal combustion engine of a vehicle of claim 12, further comprising step of:

a repredicting step for repredicting an output of the internal combustion engine and a running load when an actual output of the internal combustion engine and an actual running load deviates from the predicted output of the internal combustion engine and the predicted running load predicted at said predicting step beyond fixed allowable limits respectively.

14. A method for controlling auxiliary equipment driven by an internal combustion engine of a vehicle of claim 12, further comprising a step of:

an energy storing step for storing the energy generated by the internal combustion engine when the internal combustion engine is being operated under a specific operating condition where a fuel increasing amount required for driving auxiliary equipment is less than a fixed amount, and supplying the stored energy for driving auxiliary equipment when the internal combustion engine is not being operated under the specific operating condition.

15. A method for controlling auxiliary equipment driven by an internal combustion engine of a vehicle of claim 10 or 11, wherein running environment information is obtained from a navigation system.

16. A method for controlling auxiliary equipment driven by an internal combustion engine of a vehicle of claim 10 or 11, wherein running environment information is obtained from a means for acquiring information concerning the traffic condition by communicating with information sources.

* * * * *